Figure 1:
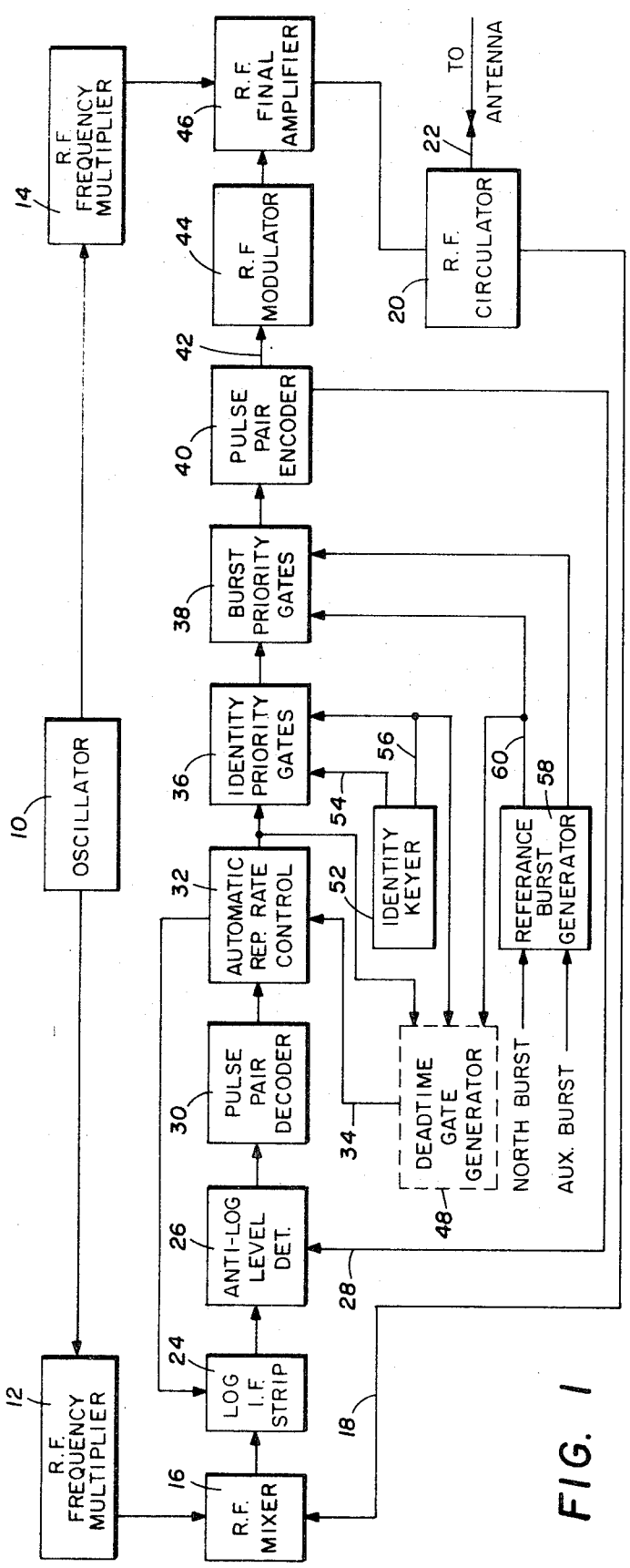

United States Patent [19]
Thornberg et al.

[11] 3,754,251
[45] Aug. 21, 1973

[54] ANTI-SYNCHRONOUS REPLY CIRCUIT

[75] Inventors: Dean S. Thornberg; Allen C. Capes, both of Salt Lake City, Utah

[73] Assignee: LTV Electrosystems, Inc., Greenville, Tex.

[22] Filed: Jan. 17, 1972

[21] Appl. No.: 218,164

[52] U.S. Cl.......................... 343/6.8 LC, 343/6.5 LC
[51] Int. Cl.............................................. G01s 9/56
[58] Field of Search................... 343/6.5 R, 6.5 LC, 343/6.8 R, 6.8 LC

[56] References Cited
UNITED STATES PATENTS
3,646,556   2/1972   Bishop ........................... 343/6.5 R
3,680,090   7/1972   Bishop ........................... 343/6.5 LC Primary Examiner—Benjamin A. Borchelt
Assistant Examiner—G. E. Montone
Attorney—James D. Willborn, Harold E. Meier et al.

[57] ABSTRACT

In radio navigation systems located in areas that are rich with interrogation reflections a variable dead time provides smearing of replies during the interrogation time window generated by the interrogation reflections. A radio navigation system of the type described receives a pair of interrogation pulses which are decoded into a single pulse for operation of a reply transmitter. The interrogation pulse receiver decodes the interrogation pulses only during the active time span thereof and when received interrogation pulses are spaced over the required time span. The transmitter generates position determining signals in response to the decoded interrogation pulses. To block-out or smear the position determining signals emitting from the transmitter generated by interrogation pulse reflections, a variable width blanking pulse is generated for deactivating the interrogation pulse receiver. This variable width blanking pulse is generated in an anti-synchronous circuit responsive to the decoded interrogation pulses and timed clock pulses.

11 Claims, 2 Drawing Figures

ANTI-SYNCHRONOUS REPLY CIRCUIT

This invention relates to a radio navigation system and more particularly to a radio navigation system having a variable dead time for minimizing replies to false interrogation pulses.

Radio navigation systems of the type to which the present invention is directed include, but is not limited to the TACAN or DME systems. Both the TACAN (Tactical Air Navigation System) and DME (Distance Measuring Equipment) rely upon receiving an interrogation pulse from an aircraft desiring position data and transmitting a reply to the aircraft. Usually, the interrogation is by way of a pair of pulses separated by a fixed spacing such as 12 microseconds. For effective operation of the TACAN or DME systems, it is essential that a reply pulse be triggered by a true interrogation pulse pair, separated by the fixed spacing of 12 microseconds, and not by interrogation pulse reflections. Apparatus for decoding the interrogation signal and generating a reply signal includes many well-known circuit configurations.

Since pulse pairs are the employed signals, it is necessary to distinguish between a true pulse pair signal and an incoming signal which is composed of a first pulse pair plus a second pulse which is an echo of the first pulse and spaced therefrom by 12 microseconds.

A common problem associated with TACAN ground transponders located in areas that are rich with reflections of aircraft interrogations is that a false range lock of the airborne TACAN equipment. In many TACAN ground transponders, each decoded interrogation is followed by a reply and then by a fixed forced dead time of approximately 60 microseconds and a false interrogation is most likely to occur just after the end of the dead time period, generated by a previous interrogation. It appears to the ground transponder that the false interrogation is, in fact, another interrogation arriving after the previous direct-path interrogation. During the dead time period, arriving echo interrogations cannot produce a reply; however, a pulse interrogation can occur just after the cessation of the dead time gate. With the fixed dead time systems, if multiple echos exist and persist for relatively long time periods, they can produce a train of false range replies, and the spacing between successive false replies will tend to approximate the duration of the dead time gate.

To overcome the problem of receiver response to interrogation reflections, some investigators propose decreasing the receiver sensitivity for a period of time after the dead time gate in proportion to the strength of the incoming interrogations. This solution has the adverse effect of decreasing the effective range of the ground station dependent on the number of interrogating aircraft at a relative distance from the station. Thus, a distant aircraft would lose range information completely as a close in aircraft de-sensitizes the station. Another suggested solution is to increase the receiver dead time long enough to blank the latest arriving echo which could possibly occur at a particular site. Some sites, however, are so rich in echos that this approach increases the receiver off time to an excessive value.

In accordance with the present invention, a radio navigation system having a navigation receiver for decoding interrogation pulses and a transmitter responsive to the decoded pulses includes an anti-synchronous reply circuit which receives and responds to the decoded interrogation pulses. A fixed time width pulse is generated from the decoded interrogation pulse to trigger a bi-stable circuit that generates a blanking pulse to disable the navigation receiver. In addition, the fixed time width pulse connects to a circuit which also responds to a series of timing pulses to reset the bi-stable circuit to the first of its two stable conditions, thereby producing a variable width blanking pulse.

A more complete understanding of the invention and its advantages will be apparent from the specification and claims and from the accompanying drawings illustrative of the invention.

Figure 2:
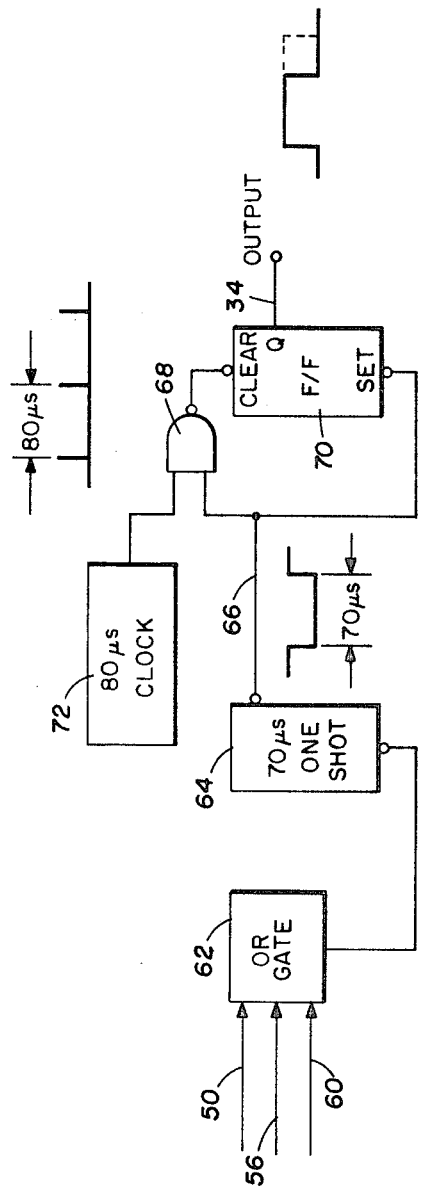

Referring to the drawings:

FIG. 1 is a block diagram illustrating a TACAN type radio navigation ground transponder; and FIG. 2 is a block diagram of an anti-synchronous reply circuit for producing a variable dead time gate.

In the TACAN system, a ground station receiver is interrogated by pulse pairs, the pulses of a pair being separated by 12 microseconds in one mode of operation. In response to the received pulse pair, a ground station transmitter is caused to be triggered and to transmit other pulse pairs, the distance measuring being accomplished by metering the time lapse between the interrogation and response pulse signals plus a fixed delay inherent in the equipment. With the present invention, the sensitivity of the system is maintained at a desired level and false interrogation pulses, that is, interrogation reflections, are blanked out by generating a variable width dead time gate. This permits operation of the TACAN ground transponder in the presence of echos and insures that no echo can be replied to repeatedly. Since the present invention prohibits repeated replies to the same echo, it eliminates false range lock-on where the airborne interrogator is designed to lock-on only to signals occurring repeatedly in a relatively narrow time slot. This is achieved by varying the dead time period in a random manner; i.e., jittering the trailing edge of the dead time gate. The range of jitter (difference between the minimum and maximum values of dead time) is greater than the duration of the range "window" of the airborne interrogator such that a greater percentage of echo interrogations will fall outside of the range "window" and therefore not allow the airborne interrogator to lock-on to a false reply.

Referring to FIG. 1, there is shown a simplified block diagram of a TACAN ground station including a crystal oscillator 10 providing reference frequency to frequency multipliers 12 and 14. The frequency multiplier 12 provides a mixing frequency to a mixer 16 for beating with a received radio frequency on a line 18. A signal on the line 18 represents a pair of interrogation pulses transmitted from an interrogating aircraft and received by the ground transponder. These signals are transmitted from a circulator 20 directly connected to an antenna (not shown) by means of a line 22.

An IF signal from the mixer 16 is applied to an input of a log amplifier 24 that includes circuitry for automatically controlling the sensitivity of the system. An output from the amplifier 24 represents the detected video signal which is applied to an anti-log level detector 26 which also receives a blanking gate signal on a line 28. The interrogation video signal from the detector 26 connects to a pulse pair decoder 30 and then to an automatic repetition rate control circuit 32. The circuit 32 also receives a dead time gate signal on line 34 and generates the automatic sensitivity control signal to the log amplifier 24. At the output of the automatic rate control circuit 32 there is generated a decoded interrogation pulse signal applied to an identity priority gate 36. From the priority gate 36 the decoded interrogation pulse signal is connected to a burst priority gate 38 and to a pulse pair encoder 40. The pulse pair encoder 40 produces a pair of output pulses on a line 42 representing a reply to the interrogation pulses received on the line 18. This pulse pair reply is modulated in an R.F. modulator 44 and amplified in an R.F. amplifier 46, the latter also receiving a frequency signal from the multiplier 14. The output of the amplifier 46 is applied to a second input of the circulator 20 for transmission to the interrogating aircraft through the antenna coupled to the line 22.

As described previously, the present invention provides a jittering of the trailing edge of the dead time gate on line 34 applied to the automatic rate control circuit 32. This dead time gate signal on line 34 is generated in a dead time gate generator 48 having three input signals, any one of which triggers the generator to produce the dead time gate signal. The first of these signals on a line 50 is the decoded interrogation pulses from the output of the control circuit 32. A second input is generated by an identity keyer 52 providing an identity signal on line 54 to the priority gate 36 and an identity gate signal on line 56 to the priority gate 36 and the dead time generator 48. The third input to the dead time generator 48 is provided by a burst generator 58 on a line 60. The burst generator 58 also generates a burst signal to the priority gate 38. In addition, the burst gate signal on line 60 is applied to the priority gate 38. The burst generator 58 receives trigger signals from the antenna.

Referring to FIG. 2, there is shown a block diagram of the dead time gate generator 48 which comprises the anti-synchronous reply circuit for jittering the trailing edge of the dead time gate signal on line 34. Decoded interrogation pulses on line 50, identity gate signals on line 56 and burst gate signals on line 60 are connected to individual inputs of an OR gate 62. Either one of the signals to the OR gate 62 generates a triggering pulse to a one-shot multi-vibrator 64. In one embodiment of the invention, the one-shot multi-vibrator 64 produces a 70 microsecond wide pulse on a line 66. This 70 microsecond wide pulse is applied to one input of a NAND gate 68 and the reset terminal of a flip-flop 70.

A second input to the NAND gate 68 is provided by a clock pulse generator 72. Specifically, the generator 72 provides a clock pulse every 80 microseconds to the second input of the NAND gate 68. The output of the NAND gate 68 is coupled to the clear terminal of the flip-flop 70. An output of the flip-flop 70 on line 34 connects to the automatic rate control circuit 32.

In operation of the circuit of FIG. 2, input pulses (airborne interrogations) are decoded and connected to the OR gate 62. The decoded interrogation pulses triggers the one-shot multi-vibrator 64 thereby generating a 70 microsecond wide negative going pulse on the line 66. This pulse disables the NAND gate 68 and also sets the flip-flop 70 such that the output thereof is a positive value. At the end of the 70 microsecond pulse, the NAND gate 68 is again enabled and the flip-flop "reset" terminal is released so that the flip-flop 70 may be cleared by the next output from the NAND gate 68. The first clock pulse from the clock generator 72 after enabling the NAND gate 68, will produce an output from the gate 68 and clear the flip-flop 70. This returns the output of the flip-flop 70 to the zero voltage level.

Since the 80 microsecond repetition rate of the clock 72 is not synchronized with the output of the one-shot multi-vibrator 64, the output pulse from the flip-flop 70 can be as short as 70 microseconds (the trailing edge of the 70 microsecond pulse and a clock pulse appearing simultaneously) or as long as 150 microseconds (a clock pulse appearing immediately before the trailing edge of the 70 microsecond pulse) or the pulse width could lie anywhere in between these two limits. Furthermore, and most importantly, the pulse width will be unpredictable and will vary in a random manner thus prohibiting repeated replies to interrogation reflections or echos received on the line 22.

In operation of the anti-synchronous reply circuit of FIG. 2 with the ground station of FIG. 1, an interrogation pulse pair on the line 18 is processed through the station and decoded. The decoded interrogation pulses generate a reply pulse pair which is transmitted from the antenna connected to the line 22 to the interrogating aircraft for position determination. The decoded interrogation pulses also actuate the anti-synchronous reply circuit to produce a dead time gate signal on the line 34 to disenable the rate control circuit 32. This prevents additional reply pulses from being generated and transmitted to the interrogating aircraft.

Such additional reply pulses may be generated from echos or reflections of the original interrogation pulse pair on the line 18. Such reflections or echos are thus blanked out from producing erraneous reply pulses.

Although additional reply pulses may be generated when the dead time gate is a zero value, such reply pulses will be distributed or smeared over the receiving window of the interrogating aircraft and such interrogating aircraft will not respond to these reply pulses.

While only one embodiment of the invention, together with modifications thereof, has been described in detail herein and shown in the accompanying drawings, it will be evident that various further modifications are possible without departing from the scope of the invention.

What is claimed is:

1. An anti-synchronous reply circuit in a radio navigation system wherein coded interrogation pulses actuate circuitry for producing a reply signal, comprising:
   means responsive to a decoded interrogation pulse received by the navigation system for generating a fixed time width pulse,
   a bi-stable circuit responsive to the fixed time width pulse and triggered thereby into a second of two stable conditions, and
   circuit means connected to said bi-stable circuit and responsive to the fixed time width pulse and a series of timed clock pulses for returning said bi-stable circuit to a first stable condition upon the occurrence of a timed clock pulse after the termination of the fixed time width pulse.

2. An anti-synchronous reply circuit in a radio navigation system as set forth in claim 1 including clock means for generating a series of timed clock pulses to said circuit means.

3. An anti-synchronous reply circuit in a radio navigation system as set forth in claim 1 wherein said means responsive to a decoded interrogation pulse includes a one shot multi-vibrator generating a fixed time width output pulse.

4. An anti-synchronous reply circuit in a radio navigation system as set forth in claim 1 wherein said bistable circuit includes a flip-flop having a "set" input terminal responsive to the fixed time width pulses and a "clear" terminal connected to said circuit means.

5. A radio navigation system including a navigation receiver for decoding interrogation pulses and a transmitter responsive to the decoded pulses, comprising:
   a one-shot multi-vibrator responsive to the decoded interrogation pulse for generating a fixed time width output pulse,
   a flip-flop having a "set" terminal responsive to the fixed time width output pulse of said one-shot multi-vibrator for generating a blanking pulse to disable the navigation receiver from decoding received interrogation pulses, and
   circuit means connected to a clear input terminal of said flip-flop and responsive to the fixed time width pulse of said one-shot multi-vibrator along with a series of timed clock pulses for returning said flip-flop to a first of two stable conditions upon the first occurrence of a timed clock pulse after termination of the fixed time width output pulse of said one-shot multi-vibrator to vary the blanking pulse width.

6. A radio navigation system as set forth in claim 5 including clock means for generating a series of timed clock pulses connected to said circuit means.

7. A radio navigation system as set forth in claim 6 wherein said circuit means includes a NAND gate having one input connected to receive the series of timed clock pulses from said clock means and a second input connected to the fixed time width output pulse from said one-shot multi-vibrator.

8. A radio navigation system including a navigation receiver for decoding interrogation pulses and a transmitter responsive to the decoded pulses, comprising in combination:
   first means responsive to an input pulse for generating a fixed time width pulse,
   output means for generating a first output signal to enable the navigation receiver and a blanking pulse to disable the navigation receiver from decoding the interrogation pulses,
   clock means for generating a series of timed clock pulses, and
   circuit means responsive to the fixed time width pulses and the timed clock pulses for returning said output means to the first output signal upon the occurrence of a timed clock pulse after termination of the fixed time width pulse.

9. A radio navigation system as set forth in claim 8 including input means responsive to any one of a plurality of control signals for generating the input pulse to said first means.

10. An anti-synchronous reply circuit in a radio navigation system, comprising in combination:
    means responsive to any one of a plurality of input pulses for generating a fixed time width pulse,
    a bistable circuit responsive to the fixed time width pulse and triggered thereby into a second of two stable conditions, and
    circuit means connected to said bistable circuit and responsive to the fixed time width pulse and a series of timed clock pulses for returning said bistable circuit to a first stable condition upon the occurrence of a timed clock pulse after the termination of the fixed time width pulse.

11. An anti-synchronous reply circuit as set forth in claim 10 wherein said means responsive to a plurality of input pulses includes a one-shot multi-vibrator generating the fixed time width output pulse, and
    means responsive to any one of the plurality of input signals for generating a trigger pulse to said one-shot multi-vibrator.

* * * * *

UNITED STATES PATENT OFFICE
CERTIFICATE OF CORRECTION

Patent No. 3,754,251      Dated August 21, 1973

Inventor(s) Dean S. Thornberg and Allen C. Capes

It is certified that error appears in the above-identified patent and that said Letters Patent are hereby corrected as shown below:

Assignee, "LTV Electrosystems, Inc." should be --E-Systems, Inc.--

Col. 4, line 33      "erraneous" should be --erroneous--.

Signed and sealed this 30th day of April 1974.

(SEAL)
Attest:

EDWARD M. FLETCHER, JR.
Attesting Officer

C. MARSHALL DANN
Commissioner of Patents